United States Patent [19]

Bustmante

[11] 3,955,658
[45] May 11, 1976

[54] BRAKE CONTROLLED THROTTLE HOLDER

[76] Inventor: Antonio B. Bustmante, 1633 W. Belfast, Mesa, Ariz. 85201

[22] Filed: Nov. 18, 1974

[21] Appl. No.: 524,631

[52] U.S. Cl. .................................. 192/3 T; 74/530; 188/82.3
[51] Int. Cl.² ......................................... B60K 29/02
[58] Field of Search ..................... 192/3 T; 74/530

[56] References Cited
UNITED STATES PATENTS

| | | | |
|---|---|---|---|
| 2,076,460 | 4/1937 | Heinrich | 192/3 T X |
| 2,284,380 | 5/1942 | Drabble | 192/3 T |
| 2,533,836 | 12/1950 | Patterson | 192/3 T X |
| 3,180,464 | 4/1965 | Ballard | 192/3 T |
| 3,204,734 | 9/1965 | McMaken | 192/3 T |
| 3,459,065 | 8/1969 | Fender | 74/530 X |

*Primary Examiner*—Benjamin W. Wyche

[57] ABSTRACT

The disclosure relates to a speed control device for engines and particularly automotive engines so that the throttle or speed control member on the engine may be set to operate the engine and the vehicle at any one of several desired speeds. The device includes a reciprocating member adapted to reciprocate in a rectilinear path in opposite directions and adapted to be coupled to an engine speed control member such as the carburetor throttle of the like and the reciprocable member is coupled to a means for transferring rectilinear motion to rotary motion and this means carries an arcuate row of buttress teeth adapted to be engaged by a pivotal latch pawl which is readily disengagable from the teeth by means of a fluid operated device such as a hydraulic cylinder operable by hydraulic brake fluid so as to automatically release the latch pawl from the buttress teeth when automobile brakes are applied and also a manual control for releasing the latch pawl from the buttress teeth. The manual control being remotely located in an operators compartment of the vehicle whereby the speed control may be deliberately manually deactivated or automatically deactivated by an application of the automobile brakes.

6 Claims, 4 Drawing Figures

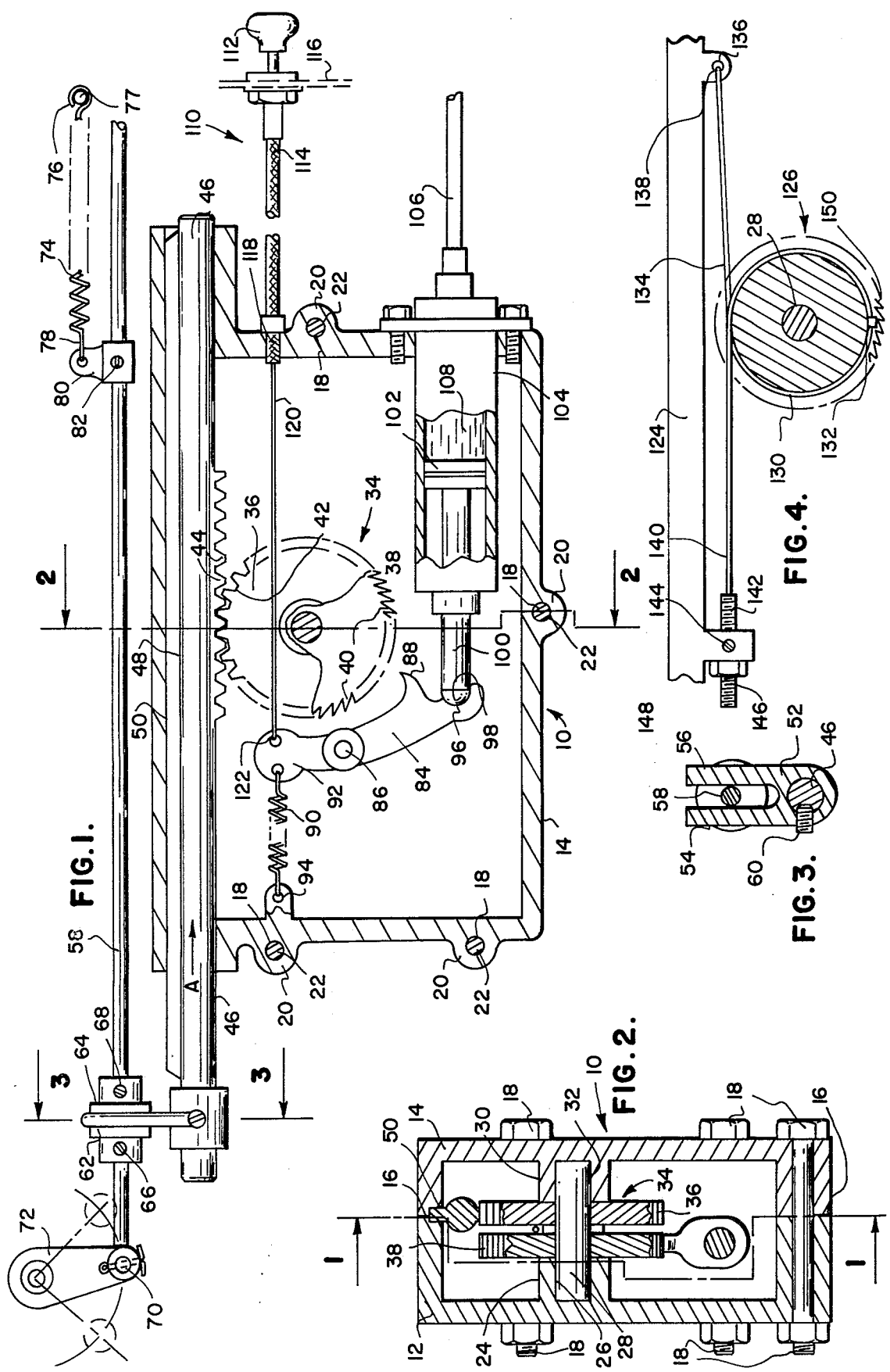

BRAKE CONTROLLED THROTTLE HOLDER

BACKGROUND OF THE INVENTION

Various speed control devices have been used for controlling the speed of vehicles such as automobiles or trucks when cruising on the highway and particularly on areas of the highway which are straight and whereon the vehicle may be set to traverse the highway at a legal speed and whereby upon application of the vehicle brakes the device may be automatically deactivated to allow the engines speed control device such as the throttle to close and to reduce the speed of the engine and the vehicle. Such devices have herebefore been very complicated and have required not only a substantial amount of expensive skilled labor to install them but the initial cost of such prior art devices have been substantial and therefore prohibitive.

The conventional cruise controls are therefore not economically available to many persons and it has been found that these controls alleviate a drivers tension and fatigue.

SUMMARY OF THE INVENTION

The present invention relates to a very simple, reliable and economical speed control devices which may be used in connection with automotive engines such as those used in conventional automobiles or trucks for maintaining a cruise speed of the respective vehicle on the highway in order to alleviate tension and fatigue of the driver. The invention comprises a simple frame adapted to be secured in juxtaposition relative to the vehicle engine and the control of the invention includes a reciprocable member adapted to be coupled with a speed control member of the engine such as a conventional throttle control rod or the like. The reciprocable member has means for translating linear motion to rotary motion and an arcuate member having buttress teeth arranged in an arcuate path in engagable by a latch pawl and means is provided for manually or automatically releasing the latch pawl from the arcuate row of buttress teeth. The automatic means being preferably operated by numatic fluid pressure or preferably by hydraulic fluid pressure such as that existing in the hydraulic brake system when the automobile brakes are applied so that the speed control may be released and deactivated when the brakes are applied automatically allowing the engine throttle to close.

The invention comprises a very simple means which is economical to produce and which is simple to operate and economical to maintain. Additionally, the invention is very simple to install and to operate properly in connection with vehicle engines. Accordingly, it is an object of the present invention to provide a very simple, economical and reliable speed control which may be economically installed on various engines so that the general public will have the advantages of a reliable control for maintaining cruise speeds of their vehicles on the highway all of which alleviate a substantial amount of driver fatigue and tension.

Another object of the invention is to provide a speed control wherein the control is automatically deactivated when the automobile brakes are applied.

Another object of the invention is to provide a speed control of this general type which is very reliable and safe.

Another object of the invention is to provide a very simple means for manually deactivating the speed control when it is not desired to use it.

Another object of the invention is to provide a speed control which may be almost universally adapted to be readily installed in connection with virtually all automotive engines.

Another object of the invention is to provide a speed control with automatic deactivating equipment which may be non-manual power operated either hydraulically, numatically or electrically depending upon whether it is desired to activate it by throttle pedal response or by hydraulic fluid pressure from the brake lines or by a solenoid of other suitable device activated in connection with the usual brake stop light which is activated in connection with the hydraulic brake system of various automotive vehicles.

Further objects and advantages of the invention may be apparent from the following specification, apended claims, and accompanying drawings.

BRIEF DESCRIPTION OF THE DRAWINGS

FIG. 1 is a sectional view of the speed control device of the invention shown in connection with a conventional engine throttle rod and carburetor throttle lever. Further, the device is illustrated with one-half of the housing frame removed to show the internal parts of the device and in addition parts are shown fragmentarily to amplify the illustration;

FIG. 2 is a transverse sectional view taken from the line 22 of FIG. 1 with a reference line 11 showing the relationship of FIG. 2 to FIG. 1;

FIG. 3 is a sectional view taken from the line 33 of FIG. 1; and

FIG. 4 is a fragmentary diagramatic view showing a modification of the means of the invention for translating reciprocable motion to rotary motion for moving buttress latch teeth of the invention in an arcuate path.

DESCRIPTION OF THE PREFERRED EMBODIMENTS

As shown in FIGS. 1 and 2, the invention comprises a box like frame 10 having a pair of separable housing portions 12 and 14 which are separable at 16 and which are held together by bolts 18 which pass through both frame housing portions 12 and 14 in areas of the housing parts which areas are designated 20. These areas 20 comprise protuberant lug portions having bore portions 22 through which the bolts 18 are extended.

The frame housing members 12 and 14 are generally box shaped and as hereinbefore described separate along the plane 16 and are generally opposed box shaped structures providing an enclosure for the operating mechanism of the speed control device of the invention.

The housing 12 is provided with an inwardly directed bearing boss 24 having a bore 26 therein in which one end of a shaft 28 is mounted. Likewise, the frame housing portion 14 is provided with an inwardly directed bearing boss 30 having a bore 32 in which the opposite end of the shaft 28 is supported.

Rotatably mounted on the shaft 28 is a rotary assembly 34 comprising a gear pinion 36 and rotary latch member 38 having an arcuate row of buttress teeth 40 at its periphery.

The pivotal latch member 38 is fixed to the pinion gear 36 and this pinion gear 36 at its periphery is provided with gear teeth 42 at its periphery which mesh with rack teeth 44 carried by a reciprocable member 46. This reciprocable member 46 is provided with a guide rib 48 to prevent rotation thereof in the housing parts 12 and 14 which are each provided with half of a guide slot 50 extending on each side of the separation plane 16 as shown in FIG. 2 of the drawings.

Coupled to the reciprocable member 46 is a yoke 52 having a pair of spaced apart fingers 54 and 56 which are adapted to straddle a conventional throttle control rod 58 all as shown best in FIGS. 1 and 3 of the drawings.

The yoke 52 is fixed to the reciprocable member 46 by means of a said screw 60 and the spaced fingers 54 and 56 are straddled by a pair of flanges 62 and 64 fixed to the throttle control rod 58 by means of respective said screws 66 and 68.

The throttle control rod 58 at its end 70 is pivotally connected to a conventional carburetor throttle lever 72. However, any other movable engine control may be actuated in connection with the reciprocable member 46 as will be hereinafter described.

A return spring 74 is provided with an end 76 fixed to a stationary pin 77 preferably mounted on the vehicle engine or on the chassis structure of the vehicle and this spring 74 at its opposite end 78 is secured to a bracket 80 mounted on the throttle rod 58 by means of a said screw 82.

Other suitable fixtures may be used as desired. The return spring tends to move the throttle rod 58 in a direction too close to the throttle for reducing the speed of the engine and also tends to reciprocate the reciprocable member 46 and to rotate the assembly 34 which is a rotary assembly including the gear pinion 36 and the arcutate buttress latch member 38.

Pivotally mounted in the housing members 12 and 14 which constitute the frame of the invention, is a latch member 84. This latch member 84 is pivotally mounted on a pin 86 carried by the housing frame of the invention and this member 84 is provided with a pawl portion 88 adapted to engage any of a plurality of the buttress teeth 40 which are arranged in an arcuate row. A spring 90 is coupled to an end 92 of the latch lever 84 and this spring is connected at 94 to the frame or housing of the invention so as to apply force tended to pivot the lever 84 into position such that the pawl portion 88 will engage the buttress teeth 40.

The pawl lever 84 is provided with a socket 96 engagable by an end 98 of a plunger 100 which is coupled to a piston 102 in a hydraulic cylinder 104. This hydraulic cylinder 104 is provided with a hydraulic fluid pressure conduit 106 adapted to communicate with the conventional hydraulic cylinder of vehicle brakes so that when the brakes are applied the piston 102 is actuated by hydraulic fluis 108 under pressure to extend the plunger 100 at its end 98 and to force the lever 84 in a direction such as to disengage the latch pawl 88 from the respective buttress teeth 40.

It will be understood that a solenoid or hydraulic control power operated device may be used in place of the hydraulic cylinder 104 to extend or retract a respective plunger similar to the plunger 100 and that such a solenoid control or hydraulic control may be activated in connection with the conventional brake light switch of a vehicle hydraulic brake system.

A manual control 110 comprises a conventional push-pull button 112 having a sheath fixture 114 adapted to be coupled to a vehicle operators compartment structure 116 and the sheath 114 at its opposite end 118 is abutted to the housing parts of the frame 10 and a control cable or wire 120 is coupled to the knob 112 and is provided with an end portion 122 coupled to the lever 92 in opposition to the spring 90 so that pulling on the knob 112 to the position as shown in the drawings causes the latch pawl 88 to be released from the buttress teeth 40. Pushing the knob 112 inward allows the spring 90 to actuate the control lever 84 so that the latch pawl 88 will automatically engage any one of the buttress teeth 40 at a speed comparable to that of the vehicle depending on the throttle setting which is usually maintained by the foot pedal actuating the conventional throttle control rod 58. Accordingly, at a given speed, the knob 112 may be pushed inwardly allowing the latch to engage the respective rachet tooth 40 to set the throttle at a fixed position.

When the brakes are applied the plunger 100 is extended and automatically releases the latch pawl 88 so that the return spring 74 may return the throttle toward close position and move the reciprocable member in the direction of an arrow A as shown in FIG. 1 of the drawing.

In the modification as shown in FIG. 4, a reciprocable member 124 corresponds to the reciprocable member 46 hereinbefore described and this modification shown in FIG. 4 includes a modified means for transferring or translating reciprocable motion to rotary motion. A rotor assembly of a modified form designated 126 is rotatably mounted on the shaft 28 and includes a circular drum 130 having a fixture 132 which secures an intermediate portion of a cable 134 to the drum 130. One end 136 of the cable 134 is fixed at 138 to the reciprocable member 124 while the opposite end portion 140 of the cable 134 is secured to an adjustable member 142 which is slidably mounted in a hollow projection 144 of the reciprocable member 142 and the member 142 is provided with a screw threaded portion 146 having a nut 148 screw threadable thereon and abutted to the hollow member 144 for adjustably tensioning the cable 134 so as to prevent lost motion between the reciprocable member 124 and the drum 130 so that means is provided for accurately translating rectilinear motion to rotary motion.

Fixed to the drum 130 is an arculate row of buttress teeth 150 which corresponds to the hereinbefore described buttress teeth 40.

It will be obvious to those skilled in the art that various modifications may be resorted to without departing from the spirit of the invention.

I claim:

1. In a vehicle engine speed control device the combination of: a frame adapted to be mounted in juxtaposition relative to an engine having a conventional moveable speed control member such as a carburetor throttle valve; a reciprocable member reciprocably mounted on said frame; guide means in said frame engagable by said reciprocable member; first means coupled to said reciprocable member for translating linear motion to pivotal motion; a pivotal member coupled to and operated by said first means; said pivotal member stationarily pivotally mounted on said frame; said pivotal member having an arcuate portion provided with buttress teeth; a latch pawl stationarily pivoted on said frame; a spring connected to said frame and said latch pawl and urging said latch pawl toward buttress engagement with said teeth for holding said pivotal member against pivotal movement in one direction; second means disposed to couple said reciprocable member to said speed control member whereby movement of said speed control member moves said reciprocable member which actuates said first means and pivots said pivotal member; and non-manual power operated means mounted on said frame and disposed for response to operation of vehicle brake and operation of said latch pawl and adapted to force it in a direction to release it from said buttress teeth.

2. The invention as defined in claim 1, wherein: said first means comprising a rectilinear gear rack and a gear pinion meshed therewith said gear pinion secured to said pivotal member.

3. The invention as defined in claim 1, wherein: said power operated means comprises a fluid actuated member.

4. The invention as defined in claim 3, wherein: said fluid actuated member comprises a piston; a cylinder in which said piston is reciprocally mounted and responsive to hydraulic brake fluid under pressure and adapted for actuation automatically to release said latch pawl from said buttress teeth of said pivotal member when the brakes of an automotive type vehicle are applied.

5. The invention as defined in claim 1, wherein: a remote hand operated control means is disposed for movably forcing said pawl latch in a direction to release it from said buttress teeth.

6. The invention as defined in claim 5, wherein: said hand operated control means comprises a push-pull wire control member a compression sheath for said control member, the sheath mounted on said frame and having an opposite end adapted to be mounted in relation to a stationary structure of a vehicle operators compartment and a knob on the cable for actuating it in a push-pull fashion through the sheath structure and one end of said control cable being coupled to said latch pawl member in position to pivot it out of engagement with said buttress teeth.

* * * * *

UNITED STATES PATENT OFFICE
CERTIFICATE OF CORRECTION

Patent No. 3,955,658             Dated May 11, 1976

Inventor(s) Antonio B. Bustamante

It is certified that error appears in the above-identified patent and that said Letters Patent are hereby corrected as shown below:

Inventor's name should read -- Antonio B. Bustamante --.

Signed and Sealed this

Seventh Day of September 1976

[SEAL]

Attest:

RUTH C. MASON
*Attesting Officer*

C. MARSHALL DANN
*Commissioner of Patents and Trademarks*